(12) United States Patent
Shirakawa et al.

(10) Patent No.: US 7,043,900 B2
(45) Date of Patent: May 16, 2006

(54) TURBOCHARGED ENGINE CONTROL SYSTEM

(75) Inventors: Takashi Shirakawa, Yokohama (JP); Makoto Sakai, Chigasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 166 days.

(21) Appl. No.: 10/886,658

(22) Filed: Jul. 9, 2004

(65) Prior Publication Data

US 2005/0109028 A1    May 26, 2005

(30) Foreign Application Priority Data

Jul. 31, 2003  (JP) ............................ 2003-284235

(51) Int. Cl.
*F01N 5/04* (2006.01)

(52) U.S. Cl. ........................... 60/280; 60/287; 60/291; 60/297; 60/311

(58) Field of Classification Search ................. 60/277, 60/280, 287, 291, 297, 311
See application file for complete search history.

(56) References Cited

U.S. PATENT DOCUMENTS

| | | | | |
|---|---|---|---|---|
| 5,934,072 A | * | 8/1999 | Hirota et al. ................. | 60/301 |
| 6,065,449 A | * | 5/2000 | Fukuma ....................... | 123/436 |
| 6,405,528 B1 | * | 6/2002 | Christen et al. .............. | 60/295 |
| 6,708,486 B1 | * | 3/2004 | Hirota et al. ................. | 60/297 |
| 6,796,118 B1 | * | 9/2004 | Kitahara ....................... | 60/285 |
| 6,851,256 B1 | * | 2/2005 | Chamoto et al. ............. | 60/280 |
| 2004/0000139 A1 | * | 1/2004 | Kawashima et al. .......... | 60/295 |

FOREIGN PATENT DOCUMENTS

JP     2003-027919 A     1/2003

* cited by examiner

*Primary Examiner*—Thomas Denion
(74) *Attorney, Agent, or Firm*—Shinjyu Global IP Counselors

(57) ABSTRACT

A turbocharged engine control system is provided that comprises an exhaust gas after-treatment system and a variable-capacity turbocharger. The turbocharged engine control system is configured to estimate a clogging ratio of the exhaust gas after-treatment system based on an equivalent surface area of the exhaust gas after-treatment system. A correction value is determined based on a turbine outlet pressure and the correction value is added to the clogging ratio. A target nozzle opening value is corrected such that the nozzle opening value increases as the exhaust gas after-treatment system becomes more clogged. Consequently, as the exhaust gas after-treatment system becomes clogged, the increase in pressure on the inlet side of the exhaust turbine (which acts as back pressure with respect to the engine) is suppressed and the increase in the internal EGR ratio caused by residual gas is also suppressed.

9 Claims, 12 Drawing Sheets

TURBOCHARGED ENGINE CONTROL SYSTEM

BACKGROUND OF THE INVENTION

1. Field of the Invention

The present invention generally relates to a turbocharged engine control system for an engine that is equipped with a variable-capacity turbo supercharger and has an exhaust gas after-treatment system in an exhaust passage such as a particulate filter. More specifically, the present invention relates to a turbocharged engine control system that prevents a rapid clogging in the exhaust gas after-treatment system caused by an increase in a pressure loss in the exhaust gas after-treatment system.

2. Background Information

Harmful exhaust components such as carbon particles and other particulate matters (particulate matter or "PM") contained in an exhaust gas have become an enormous problem especially in diesel engines. Conventionally, various types of particulate matter capturing filters (Diesel Particulate Filter or "DPF") have been used as exhaust gas after-treatment devices to collect and remove the particulate matter contained in the exhaust gas.

For example, Japanese Laid-Open Patent Publication No. 2003-27919 describes an exhaust gas after-treatment device for a turbocharged diesel engine in which a particulate filter is used to treat the particulate matter in the exhaust gas. In the above mentioned reference, an exhaust gas turbine is positioned in an upstream portion of an exhaust passage and the particulate filter is disposed downstream of the exhaust gas turbine.

In view of the above, it will be apparent to those skilled in the art from this disclosure that there exists a need for an improved turbocharged engine control system. This invention addresses this need in the art as well as other needs, which will become apparent to those skilled in the art from this disclosure.

SUMMARY OF THE INVENTION

It has been discovered that when a particulate filter is used as in the above mentioned reference, a problem of pressure loss in the particulate filter occurs as the particulate matter accumulates in the particulate filter, which results in a clogging of the particulate filter. Especially, the clogging of the particulate filter may cause engine operation conditions to change, and as a chain reaction, the clogging of the particulate filter may be further promoted.

For example, when the particulate filter is used in a supercharged diesel engine equipped with turbo supercharger as in the above mentioned reference, the pressure in the vicinity of an inlet of the particulate filter increases when the pressure loss in the particulate filter increases as the particulate matter accumulates in the particulate filter over time. As a result, the efficiency of the turbo supercharger declines. Moreover, a volumetric efficiency declines and/or an internal exhaust recirculation increases since the back pressure of the engine increases. Thus, an engine output declines. In such a case, in order to maintain a desired output, the driver will unintentionally increase a depression amount of an accelerator pedal to increase an accelerator opening degree by an amount the engine output declined. Accordingly, a fuel injection quantity will be increased and an air-fuel ratio will be reduced. Thus, the particulate matter in the exhaust gas increases as the internal exhaust gas recirculation increases, and thus, the clogging of the particulate filter is further promoted. The clogging of the particulate filter promotes the increase of the particulate matter in the exhaust gas as explained above. As a result, the clogging of the particulate filter progresses rapidly.

Moreover, when the turbo supercharger is a variable-capacity turbo supercharger in which an opening degree of a nozzle of the exhaust turbine is variably controlled, the opening degree of the nozzle is set to a relatively smaller degree in response to an increase in pressure in the vicinity of the inlet of the particulate filter caused by the clogging in order to compensate for the reduction in the amount of fresh air. Thus, the pressure in the vicinity of the inlet of the exhaust turbine (i.e., the back pressure of the engine) increases further and the internal exhaust gas recirculation increases. As a result, a vicious cycle of declining engine output and depressing the accelerator pedal to compensate the engine output is further promoted.

In view of the above, one object of the present invention is to provide a turbocharged engine control system for an engine equipped with a variable-capacity turbo supercharger and an exhaust gas after-treatment system such as a particulate filter that prevents a progress of chain-reaction clogging of the particulate filter by appropriately controlling the engine and the turbo supercharger in response to the clogging, i.e., increase in pressure loss in the particulate filter.

In order to achieve the above mentioned and other objects, a turbocharged engine control system is provided that comprises an exhaust gas after-treatment system, a variable-capacity turbocharger, an equivalent surface area estimating section and a nozzle opening degree correcting section. The exhaust gas after-treatment system is disposed in an exhaust passage and configured and arranged to accumulate exhaust particulate matter discharged from an engine. The variable-capacity turbocharger includes an exhaust turbine disposed in the exhaust passage and has a variable nozzle with an opening degree being variably controlled to change a capacity of the variable-capacity turbocharger. The equivalent surface area estimating section is configured and arranged to estimate an equivalent surface area of the exhaust gas after-treatment system which decreases due to an accumulation of the exhaust particle matter in the exhaust gas after-treatment system. The nozzle opening degree correcting section is configured and arranged to correct the opening degree of the variable nozzle to a larger degree in response to a decrease in the equivalent surface area of the exhaust gas after-treatment system that was estimated by the equivalent surface area estimating section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
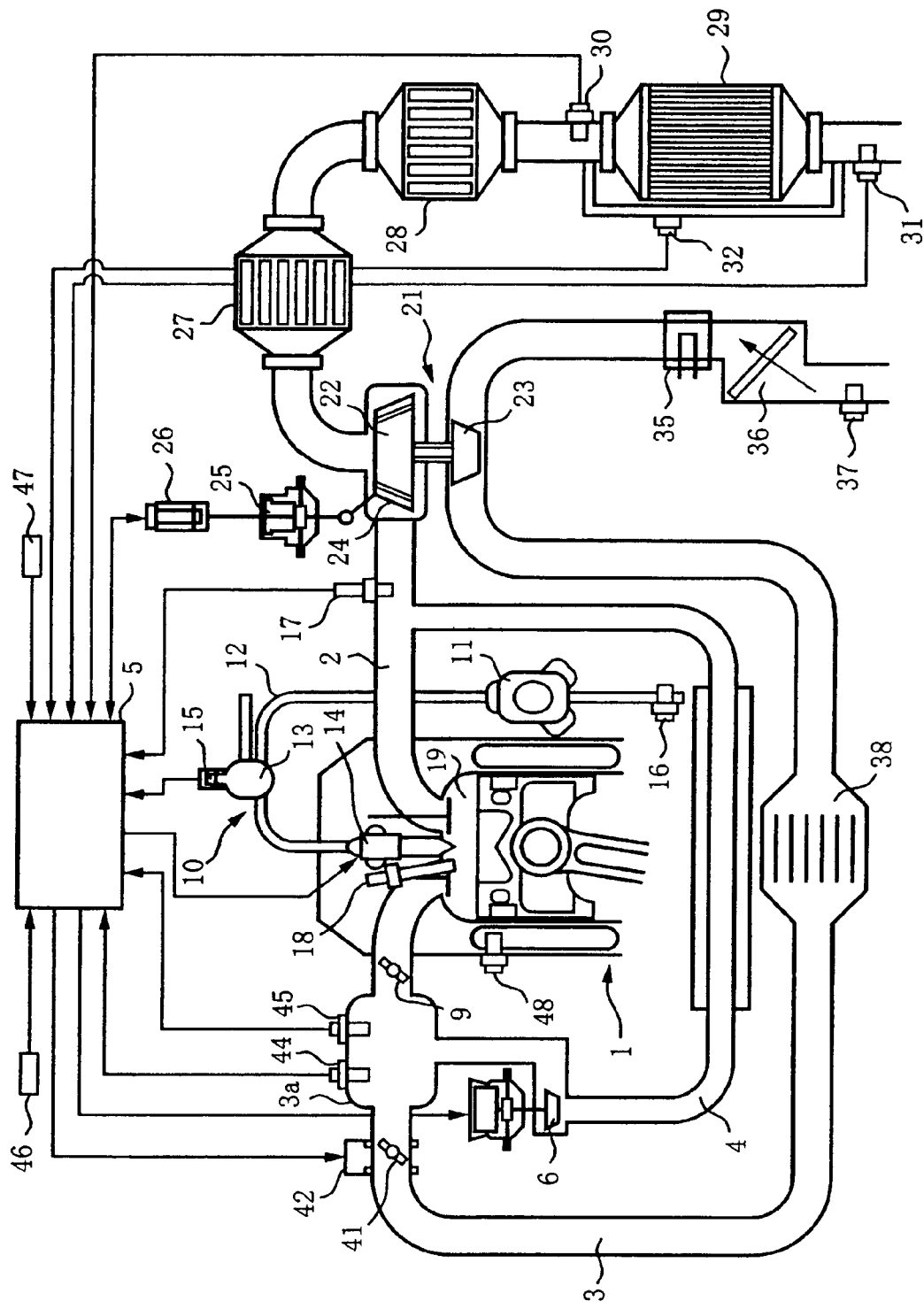
FIG. 1 is a diagrammatic view of a diesel engine equipped with a turbocharged engine control system in accordance with one embodiment of the present invention.

Referring initially to FIG. 1, a turbocharged engine control system is illustrated for an internal combustion engine such as a turbocharged diesel engine 1 in accordance with a first embodiment of the present invention. The turbocharged engine control system in accordance with the present invention can be applied to other internal combustion engines used in automobiles and the like. The engine 1 preferably performs a comparatively large quantity of exhaust gas recirculation (EGR).

As seen in FIG. 1, the engine 1 has an exhaust passage 2 and an intake passage 3 with a collector 3a. An EGR passage 4 links the exhaust passage 2 to the collector 3a of the air intake passage 3. The operation of the engine 1 is controlled by an engine control unit 5. More specifically, the control unit 5 preferably includes a microcomputer with a control program that controls the engine 1 as discussed below. The control unit 5 can also include other conventional components such as an input interface circuit, an output interface circuit, and storage devices such as a ROM (Read Only Memory) device and a RAM (Random Access Memory) device. The microcomputer of the control unit 5 is programmed to control the various components of the engine 1. The memory circuit stores processing results and control programs that are run by the processor circuit. The control unit 5 is operatively coupled to the various components of the engine 1 in a conventional manner. The internal RAM of the control unit 5 stores statuses of operational flags and various control data. The control unit 5 is capable of selectively controlling any of the components of the control system in accordance with the control program. It will be apparent to those skilled in the art from this disclosure that the precise structure and algorithms for the control unit 5 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

An EGR valve 6 is disposed in the EGR passage 4 and is operatively connected to the engine control unit 5. Preferably, the valve opening degree of the EGR valve 6 can be continuously and variably controlled by a stepping motor or any other device that can continuously and variably control the valve opening degree of the EGR valve 6. The valve opening degree of the EGR valve 6 is controlled by the engine control unit 5 to obtain a specified EGR rate in response to the operating conditions received by the engine control unit 5 from various operating condition sensors. In other words, the valve opening degree of the EGR valve 6 is variably controlled so as to variably control the EGR rate towards a target EGR rate set by the engine control unit 5. For example, the EGR rate is set to a large EGR rate when the engine 1 is operating in a low-speed, low-load region, and as the engine speed and load becomes higher, the EGR rate becomes lower.

A swirl control valve 9 is provided in the intake passage 3 in the vicinity of an air intake port of the engine 1. The swirl control valve 9 is configured and arranged to produce a swirling flow inside the combustion chamber 19 depending on the operating conditions of the engine 1. The swirl control valve 9 is driven by an actuator (not shown) and opened and closed in response to a control signal from the control unit 5. For example, the swirl control valve 9 is preferably closed in a low load and low speed condition to produce a swirling flow inside the combustion chamber 19.

The engine 1 is also preferably equipped with a common rail fuel injection device 10. In this common rail fuel injection device 10, after fuel is pressurized by a high pressure fuel pump 11, the fuel is fed through a high-pressure fuel supply passageway 12 such that the fuel accumulates in an accumulator 13 (common rail). The fuel is then distributed from this accumulator 13 to a plurality of fuel injection nozzles 14 for each of the engine cylinders. The control unit 5 is configured to control the opening and closing of the nozzles of each of the fuel injection nozzles 14 to inject fuel into the engine cylinders. The fuel pressure inside the accumulator 13 is variably adjusted by a pressure regulator (not shown) and a fuel pressure sensor 15 is provided in the accumulator 13 for detecting the fuel pressure. The fuel pressure sensor 15 is configured and arranged to output to the control unit 5 a fuel pressure signal that is indicative of the fuel pressure in the accumulator 13.

A fuel temperature sensor 16 is arranged upstream of the fuel pump 11. The fuel temperature sensor 16 is configured and arranged to detect the fuel temperature and output to the control unit 5 a signal that is indicative of the fuel temperature. In addition, a conventional glow plug 18 is arranged in the combustion chamber 19 of each of the engine cylinders to ignite the fuel in each combustion chamber 19.

The engine 1 has a variable-capacity turbo supercharger 21 equipped with a coaxially arranged exhaust turbine 22 and a compressor 23. For example, a variable geometric turbocharger having a variable geometric valve system can be used as the variable-capacity turbo charger 21. Of course, it will be apparent to those skilled in the art from this disclosure that the variable-capacity turbo supercharger 21 is not limited to the variable geometric turbocharger. Rather, any type of turbo supercharger in which a capacity of the turbo supercharger is effectively varied by controlling a capacity adjusting device or devices can be utilized as the variable-capacity turbo supercharger 21 in the present invention. The exhaust turbine 22 is positioned in the exhaust passage 2 at a position downstream of a portion where the EGR passage 4 connects to the exhaust passage 2. In order to vary a capacity of the turbo supercharger 21, the turbo supercharger 21 is preferably provided with a variable nozzle 24 or a capacity adjusting device arranged at a scroll inlet of the exhaust turbine 22. In other words, a capacity of the turbo supercharger 21 can be varied depending on the engine operating conditions. For example, a relatively small capacity of the turbo supercharger 21 is preferably achieved by reducing an opening degree of the variable nozzle 24 when the exhaust gas flow rate is relatively small (such as a low speed region). On the other hand, a relatively large capacity is preferably achieved by increasing the opening degree of the variable nozzle 24 when the exhaust gas flow rate is relatively large (such as a high speed region). The variable nozzle 24 is preferably driven by a diaphragm actuator 25 configured to respond to a control pressure (negative control pressure), and the control pressure is generated using a duty-controlled pressure control valve 26. A wide-range air fuel ratio sensor 17 is provided on the upstream side of the exhaust turbine 22. The air-fuel ratio sensor 17 is configured and arranged to detect the air fuel ratio of the exhaust gas. Thus, the air-fuel ratio sensor 17 is further configured and arranged to output to the control unit 5 a signal that is indicative of the exhaust air-fuel ratio.

The exhaust system of the engine 1 includes an oxidation catalytic converter 27 disposed in the exhaust passage 2 on the downstream side of the exhaust turbine 22. The oxidation catalytic converter 27 has an oxidation catalyst that oxidizes, for example, CO and HC contained in the exhaust gas. The exhaust system of the engine 1 also includes a NOx trapping catalytic converter 28 that is configured to treat NOx in the exhaust passage 2 on the downstream side of the oxidation catalytic converter 27. Thus, the oxidation catalytic converter 27 and the NOx trapping catalytic converter 28 are arranged in sequence in the exhaust passage 2 downstream of the exhaust gas turbine 22. This NOx trapping catalytic converter 28 is configured and arranged to adsorb NOx when the exhaust air-fuel ratio of the exhaust flowing into the NOx trapping catalytic converter 28 is lean. Thus, the oxygen density of the exhaust flowing into the NOx trapping catalytic converter 28 drops. When an oxygen concentration of the exhaust gas decreases, the NOx trapping catalytic converter 28 releases the adsorbed NOx and cleans the exhaust gas by catalytic action so as to perform a purification process.

The exhaust system of the engine 1 also includes an exhaust gas after-treatment system such as a particulate filter 29 (diesel particulate filter: DPF) that is equipped with a catalyst for collecting and removing exhaust particulate matter (particulate matter or "PM"). The particulate filter 29 is provided on the downstream side of the NOx trapping catalytic converter 28. The particulate filter 29 is constructed, for example, with a wall flow honeycomb structure (alternate cannel end blocked type) having a solid-cylindrical filter material such as cordierite with a plurality of honeycomb-shaped, fine passages formed therein and the alternate ends of the passages are closed.

The exhaust system of the engine 1 also includes a filter inlet temperature sensor 30 and a filter outlet temperature sensor 31 that are provided on the inlet side and outlet side of the particulate collection filter 29, respectively. The temperature sensors 30 and 31 are configured and arranged to detect the exhaust temperature at the inlet side and outlet side, respectively. Thus, the temperature sensors 30 and 31 are further configured and arranged to output to the control unit 5 a signal that is indicative of the exhaust temperature at the inlet side and outlet side, respectively.

Since a pressure loss of the particulate filter 29 changes as the exhaust particulate matter accumulates, a pressure difference sensor 32 is provided to detect the pressure difference between the inlet and outlet of the particulate collection filter 29. Of course, it will be apparent to those skilled in the art from this disclosure that, instead of using the pressure difference sensor 32 to detect the pressure difference directly, separate pressure sensors can be provided at the inlet and the outlet of the particulate filter 29 to find the pressure difference based on the two pressure values. A muffler (not shown) is also preferably disposed downstream of the particulate collection filter 29.

The intake air system of the engine 1 preferably includes an airflow meter 35 that is configured and arranged to detect a fresh intake air quantity passing through the air intake passage 3. The airflow meter 35 is provided on the upstream side of the compressor 23 in the air intake passage 3. The airflow meter 35 is configured and arranged to output to the control unit 5 a signal that is indicative of the fresh intake air quantity passing through the air intake passage 3.

The intake air system of the engine 1 preferably includes an air filter 36 and an atmospheric pressure sensor 37 that are positioned on the upstream side of the airflow meter 35. The atmospheric pressure sensor 37 configured and arranged to detect outside pressure, i.e., atmospheric pressure. The atmospheric pressure sensor 37 is provided at the inlet of the air filter 36. The atmospheric pressure sensor 37 is configured and arranged to output to the control unit 5 a signal that is indicative of the outside air pressure entering the air intake passage 3.

The intake air system of the engine 1 preferably includes an intercooler 38 to cool the high-temperature supercharged air. The intercooler 38 is disposed in the air intake passage 3 between the compressor 23 and a collector 3a.

In addition, the intake air system of the engine 1 preferably includes an intake air throttle valve 41 that is configured to restrict the fresh intake air quantity. The intake air throttle valve 41 is installed in the air intake passage 3 on the inlet side of the collector 3a of the air intake passage 3. The opening and closing of this intake air throttle valve 41 is driven by control signals of the engine control unit 5 through an actuator 42 that preferably includes a stepper motor or the like. Further, a supercharging pressure sensor 44 that detects supercharging pressure and an intake temperature sensor 45 that detects intake air temperature are provided in the collector 3a.

The control unit 5 is configured and arranged to control a fuel injection quantity and a fuel injection timing of the fuel injection device 10, the opening degree of the EGR valve 6, the opening degree of the variable nozzle 24, and other components and functions of the engine 1. Moreover, in addition to the various sensors installed in the engine 1 as mentioned above, the control unit 5 is configured and arranged to receive detection signals from an accelerator position sensor 46 for detecting a depression amount of the accelerator pedal, an engine rotational speed sensor 47 for detecting the rotational speed of the engine, and a temperature sensor 48 for detecting the temperature of the engine coolant.

The control operations executed by the control unit 5 will now be described with reference to the functional block diagrams of FIGS. 2 and 3, and 8 to 10. Many of the functions described below are functions that can be executed using software processing. First, the processing for determining an amount of exhaust particulate matter accumulated in the particulate filter 29 is explained with reference to FIGS. 2 and 3.

Basically, in the turbocharged engine control system of the present invention, a particulate matter accumulation amount corresponding to an amount of the particulate matter accumulated in the particulate filter 29 is estimated by first calculating a passage surface area (an equivalent surface area) of the particulate filter 29 based on the Bernoulli theorem. Then, the calculated passage surface area is compared with a surface area corresponding to a case in which the accumulation amount of the exhaust particulate matter in the particulate filter 29 is zero to determine a surface area reduction ratio. Finally, the particulate matter accumulation amount in the particulate filter 29 is calculated based on the surface area reduction ratio. According to the Bernoulli theorem, when a fluid flows through a constricted portion, a surface area A of the constricted portion, a flow rate Q, a pressure difference $\Delta P$ between before and after the constricted portion, and a fluid density $\rho$ have the following relationship.

$$A = Q/\sqrt{(2\rho \Delta P)} \quad (1)$$

Thus, the processing executed in the control unit 5 described below uses the Equation (1) to calculate the equivalent surface area A of the particulate filter 29 at a particular point in time when the calculation is made.

Figure 2:
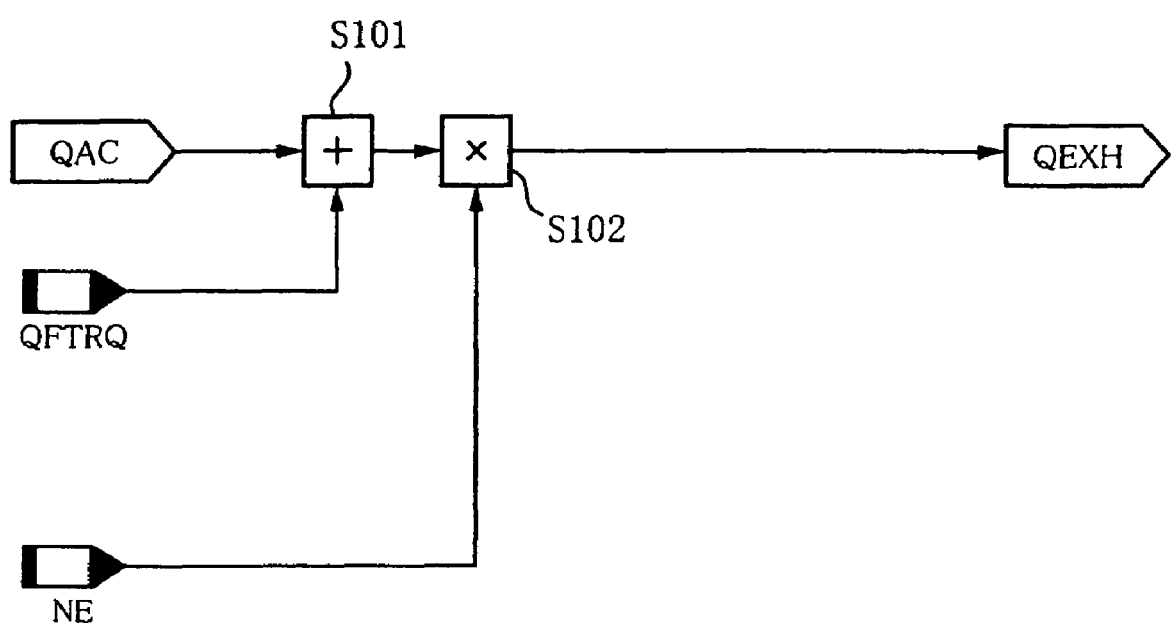
FIG. 2 is a functional block diagram illustrating a control processing executed by the turbocharged engine control system in accordance with the one embodiment of the present invention in order to determine an exhaust gas flow rate.

FIG. 2 is a functional block diagram for illustrating a flow of the processing for determining an exhaust gas flow rate QEXH. First, in step S101, a fresh air quantity QAC that flows into the cylinder and a fuel quantity QFTRQ that is injected into the cylinder are added together. Then, in step S102, the resulting sum is multiplied by the engine rotational speed NE to obtain the exhaust gas flow rate QEXH.

Figure 3:
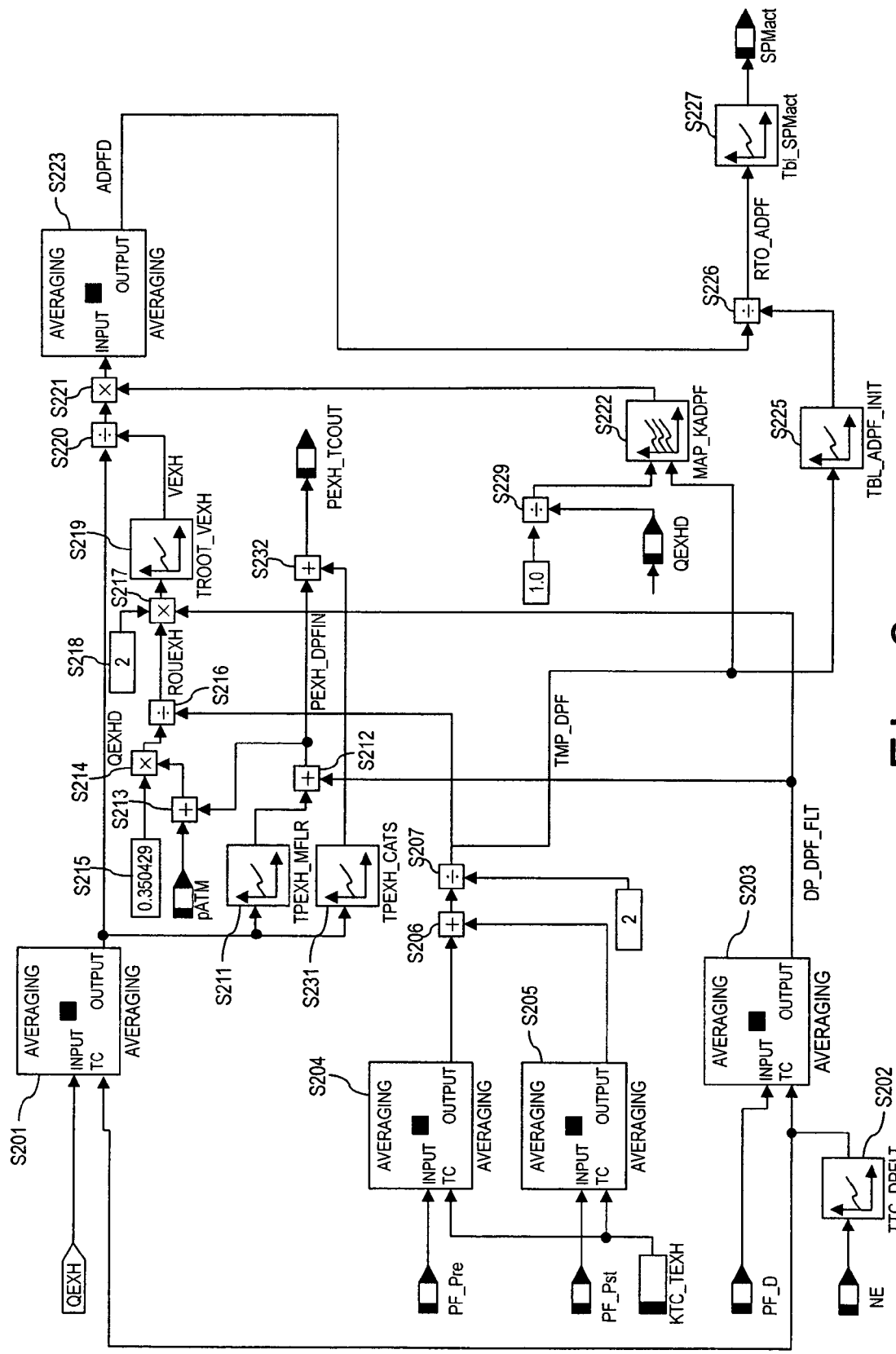
FIG. 3 is a functional block diagram illustrating a control processing executed by the turbocharged engine control system in accordance with the one embodiment of the present invention in order to determine a particulate matter accumulation amount.
Figure 4:
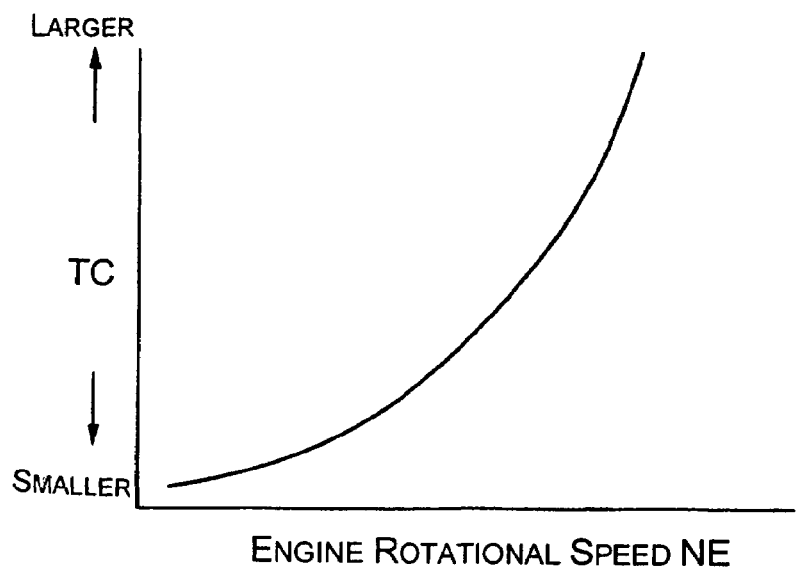
FIG. 4 is a characteristic diagram illustrating characteristics of a map TTC_DPFLT used in step S202 in the functional block diagram of FIG. 3.

FIG. 3 is a functional block diagram for illustrating a flow of the processing for determining a particulate matter accumulation amount SPMact. In step S201 of FIG. 3, the control unit 5 is configured and arranged to compute a weighted average of the consecutive values of the exhaust gas flow rate QEXH that are obtained as explained in FIG. 2. Then, the control unit 5 is configured and arranged to output the result as an exhaust gas flow rate QEXHD having an appropriate response characteristic. The filter constant (weighting coefficient) TC used in the weighted average computation in step S201 is a value found in step S202 using a prescribed map TTC_DPFLT based on the engine rotational speed NE. FIG. 4 illustrates a characteristic of the map TTC_DPFLT in which a response characteristic of the filter constant TC becomes slower when the engine is operating in a low rotational speed region, and faster when the engine is operating in a high rotational speed region.

The filter constant (weighting coefficient) TC determined in step S202 is also used in step S203 to compute a weighted average of consecutive values of an output value PF_D from the pressure difference sensor 32. The result is output as a pressure difference DP_DPF_FLT having an appropriate response characteristic.

In step S204, the control unit 5 is configured and arranged to determine a weighted average of consecutive values of an output value PF_Pre from the filter inlet temperature sensor 30. Also, in step S205, the control unit is configured and arranged to determine a weighted average of consecutive values of an output value PF_Pst from the filter outlet temperature sensor 31. In steps S204 and S205, the filter constant (weighting coefficient) TC used in the weighted average computations is set to a prescribed constant KTC_TEXH instead of using the prescribed map TTC_DPFLT shown in FIG. 4. Then, in step S206, the control unit 5 is configured and arranged to determine a temperature TMP_DPF of the particulate filter 29 as an average value of the inlet and outlet temperatures by adding the weighted average values of the output value PF_Pre and the output value PF-Pst together in step S206 and dividing the sum by a constant 2 in step S207. The temperature TMP_DPF is preferably expressed as an absolute temperature.

When the operating condition of the engine 1 changes abruptly (e.g., when the accelerator pedal depression amount increases or decreases substantially instantaneously), each parameter (i.e., the exhaust gas flow rate QEXH, the temperatures PF_Pre at the inlet and PF_post at the outlet of the particulate filter 29, and the pressure difference PF_D across the particulate filter 29) changes with a different response characteristic. More specifically, the pressure difference PF_Pre and the exhaust gas flow rate QEXH change comparatively quickly but the temperatures PF_Pre and PF_Pst change comparatively slowly. Consequently, there is a transient period during which a large error will be incurred if the particulate matter accumulation amount is estimated by reading in these detection values and using them without any adjustment to these detection values. Additionally, a step response of each parameter to a substantially instantaneous change in the engine operating condition varies depending on whether the engine rotational speed NE is high or low at the time of the change. Therefore, in this embodiment of the present invention, the appropriate filter constant TC is used in the weighted average computation of each detection value to prevent the precision of the particulate matter accumulation amount estimation from declining due to the variation in the response characteristics of the parameters. More particularly, in this embodiment of the present invention, the changes in the temperatures (i.e., PF_Pre and PF_Pst), which have the slower response characteristics than the exhaust gas flow rate QEXH and the pressure difference PF_D, are used as a reference for adjusting response characteristics of the exhaust gas flow rate QEXH and the pressure difference PF_D. Also, the filter constant TC used in the weighted average computations of the exhaust gas flow rate QEXH and the pressure difference PF_D is preferably set such that the filter constant TC changes in accordance with the engine rotational speed NE. In other words, the weighted average computations of the detection values of the exhaust gas flow rate QEXH and the pressure difference PF_D are preferably performed in steps S201 and S203 so that the response characteristics of the exhaust gas flow rate QEXH and the pressure difference PF_D substantially match with the response characteristics of the temperatures PF_Pre and PF_Pst.

In step S211, the control unit 5 is configured and arranged to use a prescribed map TPEXH_MFLR to determine a pressure rise amount by which the pressure rises due to the air flow resistance of the muffler (not shown) based on the exhaust gas flow rate QEXHD. The pressure rise amount generally becomes larger as the exhaust gas flow rate QEXHD increases. In step S212, the control unit 5 is configured and arranged to add the pressure rise amount to the pressure difference DP_DPF_FLT in the exhaust passage 2 between before and after the particulate filter 29 to obtain an output value PEXH_DPFIN. The output value PEXH_DPFIN from step S212 is equivalent to the pressure difference due to the muffler and the particulate filter 29. In step S213, the control unit 5 is configured and arranged to add an atmospheric pressure pATM to the output value PEXH_DPFIN. Thus, the output of step S213 is equivalent to the exhaust gas pressure at the inlet of the particulate filter 29. In step S214, the control unit 5 is configured to multiply the output of step S213 (exhaust gas pressure at the inlet of the particulate filter 29) by a prescribed constant (shown in step S215) that corresponds to the gas constant R (0.350429). In step S216, the control unit 5 is configured and arranged to divide the output of step S214 by the temperature TMP_DPF (absolute temperature) of the particulate filter 29 obtained in steps S204 to S207. As a result, the output of step S216 is equivalent to a density $\rho$, i.e., a specific gravity ROUEXH, of the exhaust gas. In step S217, the control unit 5 is configured and arranged to multiply the specific gravity ROUEXH by a constant 2 (shown in step S218) and by the pressure difference DP_DPF_FLT in accordance with the above explained Equation (1).

In step S219, the control unit 5 is configured and arranged to determine a square root of the output value of step S217. The square root of the output value of step S217 is found using a prescribed map TROOT_VEXH for computational convenience. The result of S219 is equivalent to the denominator of the expression on the right side of Equation (1), i.e., an exhaust gas flow speed VEXH. In step S220, the control unit 5 is configured and arranged to divide the exhaust gas flow rate QEXH by the exhaust gas flow speed VEXH, thereby obtaining a theoretical value of the surface area A of Equation (1). The theoretical value of the surface area A obtained in step S220 is set to a reference value for the equivalent surface area of the particulate filter 29. In this embodiment of the present invention, in order to increase the precision of the estimation of the particulate matter accumulation amount, the control unit 5 is configured and arranged to multiply the reference value of the equivalent surface area (i.e., the output of step S220) by an adjustment coefficient KADPF in step S221. More specifically, the equivalent surface area is adjusted in step S221 based on the exhaust gas flow rate and the temperature of the particulate filter 29 by using the adjustment coefficient KADPF.

Figure 5:
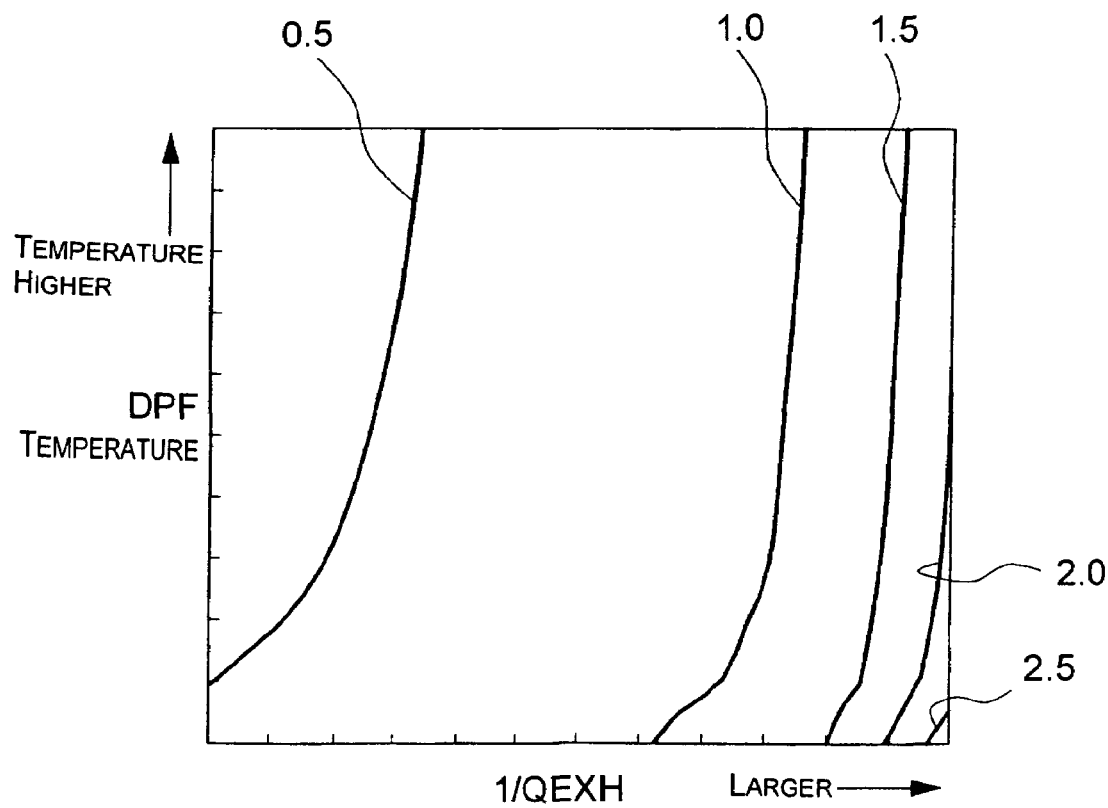
FIG. 5 is a characteristic diagram illustrating characteristics of a map MAP_KADPF used in step S222 in the functional block diagram of FIG. 3.

The adjustment coefficient KADPF is obtained in step S222 using a map MAP_KADPF configured to use an inverse value of the exhaust gas flow rate QEXHD (shown in step S229) and the temperature TMP_DPF of the particulate filter 29 as inputs. FIG. 5 illustrates the characteristic of the map MAP_KADPF. As seen in FIG. 5, the adjustment coefficient KADPF is determined according to the inverse value of the exhaust gas flow rate QEXHD (1/QEXHD), and the adjustment coefficient KADPF varies over a range, for example, from 0.3 to 3.0. In FIG. 5, reference values (0.5, 1.0, 1.5, 2.0 and 2.5) are shown in solid lines, and an interpolated value is calculated based on those two adjacent reference values in an area between the two adjacent reference values. The filter passage usage efficiency of the particulate filter 29 changes (increases or decreases) as the exhaust gas flow rate, i.e., exhaust gas pressure, changes. Therefore, the adjustment coefficient KADPF is set to have the characteristic shown in FIG. 5 to counteract the effect of the change in the filter passage usage efficiency of the particulate filter 29. Moreover, the bulk density of the particulate filter 29 increases as the temperature of the particulate filter 29 increases, which causes the surface areas of the very narrow passages of the particulate filter 29 to become physically smaller. The adjustment coefficient KADPF is designed to counteract the effects of the passages of the particulate filter 29 being smaller. Thus, although the change in the adjustment coefficient KADPF with respect to the temperature TMP_DPF is comparatively small as seen in FIG. 5, the adjustment coefficient KADPF generally becomes smaller as the temperature TMP_DPF increases. Accordingly, the equivalent surface area of the particulate filter 29 can be estimated with better precision by multiplying the reference value of the equivalent surface area by the adjustment coefficient KADPF in step S221.

In step S223, the control unit 5 is configured to compute a weighted average of the values of the equivalent surface area obtained in step S221 and output the result as an equivalent surface area ADPFD of the particulate filter 29.

Figure 6:
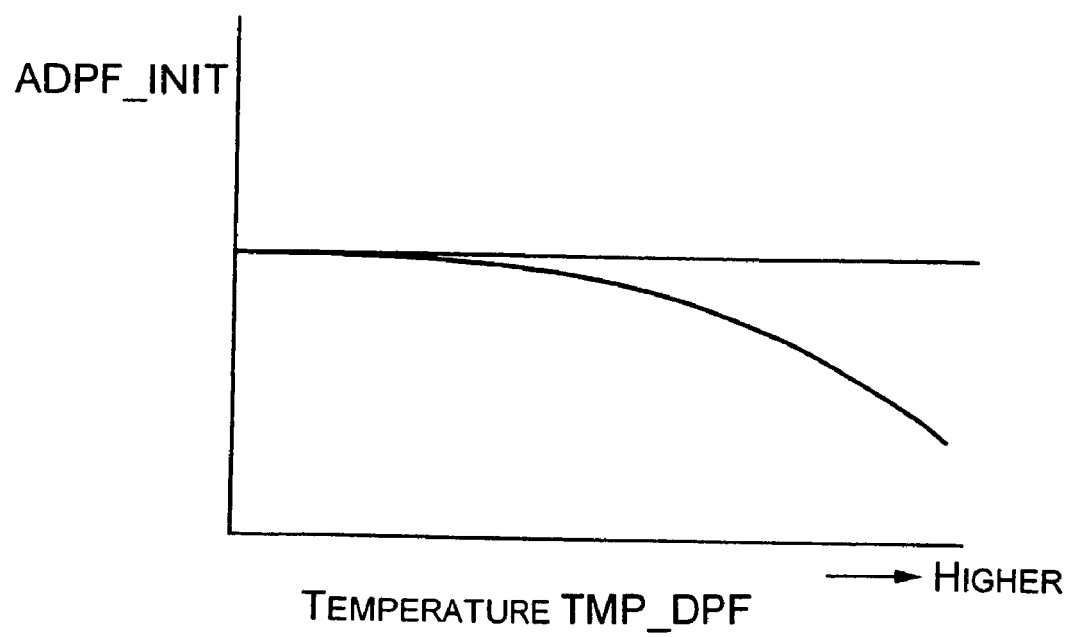
FIG. 6 is a characteristic diagram illustrating characteristics of a map TBL_ADPF_INIT used in step S225 in the functional block diagram of FIG. 3.

In step S225, the control unit 5 is configured and arranged to find an initial equivalent surface area ADPF_INIT of the particulate filter 29, which is an equivalent surface area for a hypothetical case in which absolutely no exhaust particulate matter are accumulated in the particulate filter 29. As explained above, the bulk density and, thus, the passage surface area of the particulate filter 29 changes as the temperature of the particulate filter 29 changes. Therefore, in this embodiment of the present invention, the control unit 5 is configured and arranged to adjust an equivalent surface area based on the temperature TMP_DPF by using a prescribed map TBL_ADPF_INIT to obtain the initial equivalent surface area ADPF_INIT. FIG. 6 illustrates the characteristic of the prescribed map TBL_ADPF_INIT. As seen in FIG. 6, the initial equivalent surface area ADPF_INIT is substantially constant when the temperature is low, and decreases slightly when the temperature is high.

In step S226, the control unit 5 is configured and arranged to divide the equivalent surface area ADPFD obtained in step S223 by the initial equivalent surface area ADPF_INIT obtained in S225 to determine a passage surface area reduction ratio RTO_ADPF, i.e., a ratio of clogging ("clogging ratio") caused by the exhaust particulate matter accumulated in the particulate filter 29. In step S227, the control unit 5 is configured and arranged to refer to a prescribed map Tb1_SPMact to determine the particulate matter accumulation amount (weight) SPMact based on the clogging ratio RTO_ADPF. The prescribed map Tb1_SPMact is preferably set to follow a preset characteristic of the particulate matter accumulation amount SPMact with respect to the clogging ratio RTO_ADPF.

The particulate matter accumulation amount SPMact determined in step S227 as described above is then compared with a threshold value. If the particulate matter accumulation amount SPMact has reached the threshold value, the control unit 5 is configured and arranged to execute a mandatory regeneration of the particulate filter 29. The regeneration of the particulate filter 29 can be accomplished using any of various conventional methods. For example, the exhaust particulate matter accumulated in the particulate filter 29 can be combusted by closing the intake air throttle valve 41 so that the exhaust gas temperature is raised, or by executing a post fuel injection (an additional fuel injection executed after the main injection) so that the exhaust gas temperature is raised.

Moreover, in step S231, the control unit 5 is configured and arranged to determine a pressure rise amount resulting from an air flow resistance of the catalyst devices (i.e., the NOx trapping catalytic converter 28 and the oxidation catalytic converter 27) installed in the exhaust passage 2 upstream of the particulate filter 29 using a prescribed map TPEXH_CATS based on the exhaust gas flow rate QEXHD. The pressure rise amount basically increases as the exhaust gas flow rate QEXHD increases. In step S232, the control unit 5 is configured and arranged to add the output value PEXH_DPFIN of step S212 to the pressure rise amount obtained in step S231 to obtain an output value PEXH_TCOUT. The output value PEXH_TCOUT from step S231 is equivalent to the turbine outlet pressure in the exhaust passage 2 on the outlet side of the exhaust turbine 22 upstream of the oxidation catalytic converter 27.

Figure 7:
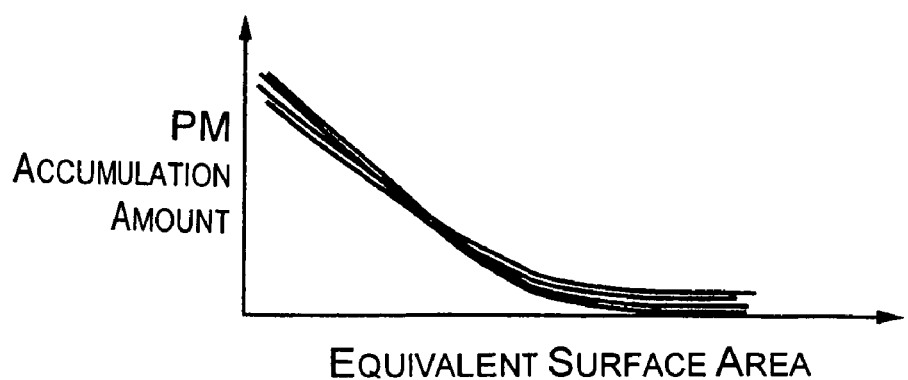
FIG. 7 is a characteristic diagram illustrating a correlation between an adjusted equivalent surface area and the particulate matter accumulation amount in accordance with the one embodiment of the present invention.

Accordingly, with the present invention, first the reference value (theoretical value) of the equivalent surface area of the particulate filter 29 is determined using a theoretical relationship based on the Bernoulli theorem. Then, the reference value is adjusted based on the exhaust gas pressure (which correlates to the exhaust gas flow rate QEXHD) and the temperature TMP_DPF of the particulate filter 29. As shown in FIG. 7, with the present invention, a substantially fixed correlation between the equivalent surface area and the particulate matter accumulation amount can be obtained in a stable manner regardless the engine operating conditions. As a result, erroneous determinations of the regeneration timing of the particulate filter 29 caused by changes in the engine operating conditions can be avoided and the particulate filter 29 can be regenerated at the appropriate timing with good repeatability.

Figure 8:
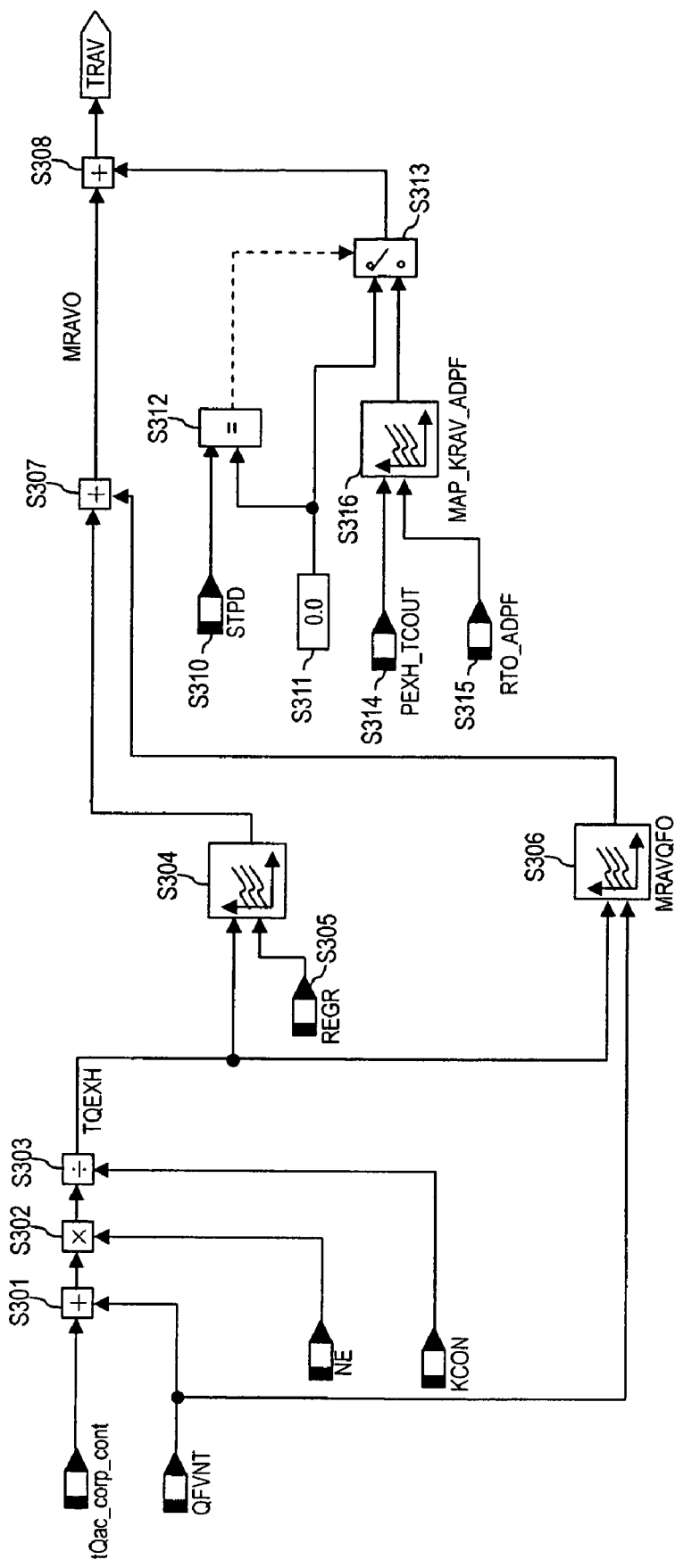
FIG. 8 is a functional block diagram of a control processing executed in the turbocharged engine control system in accordance with the one embodiment of the present invention in order to determine a target nozzle opening degree.

Referring now to FIG. 8, a control processing executed by the control unit 5 for controlling the opening degree of the variable nozzle 24 will be explained. FIG. 8 is a functional block diagram illustrating the control operations to control the opening degree of the variable nozzle 24 of the turbo supercharger 21. Basically, the opening degree of the variable nozzle 24 is corrected in a feed-forward manner based on the clogging ratio ADPFD obtained in step S223 of FIG. 3 when the EGR is not performed in the engine 1.

First, in step S301 of FIG. 8, the control unit 5 is configured and arranged to add a target fresh air quantity tQac_corp_cont to the fuel injection quantity QFVNT. In step S302, the control unit 5 is configured and arranged to multiply the result of step S301 by the engine rotational speed NE. Then, in step S303 the control unit 5 is configured and arranged to divide the output of step S302 by a constant KCON to obtain a target exhaust gas flow rate TQEXH. The operations in steps S301 to S303 are basically the same as the processing shown in FIG. 2, except that the processing shown in FIG. 2 is intended to find an actual exhaust gas flow rate QEXH while the processing in steps S301 to S303 is intended to find the target exhaust gas flow rate TQEXH.

Figure 11:
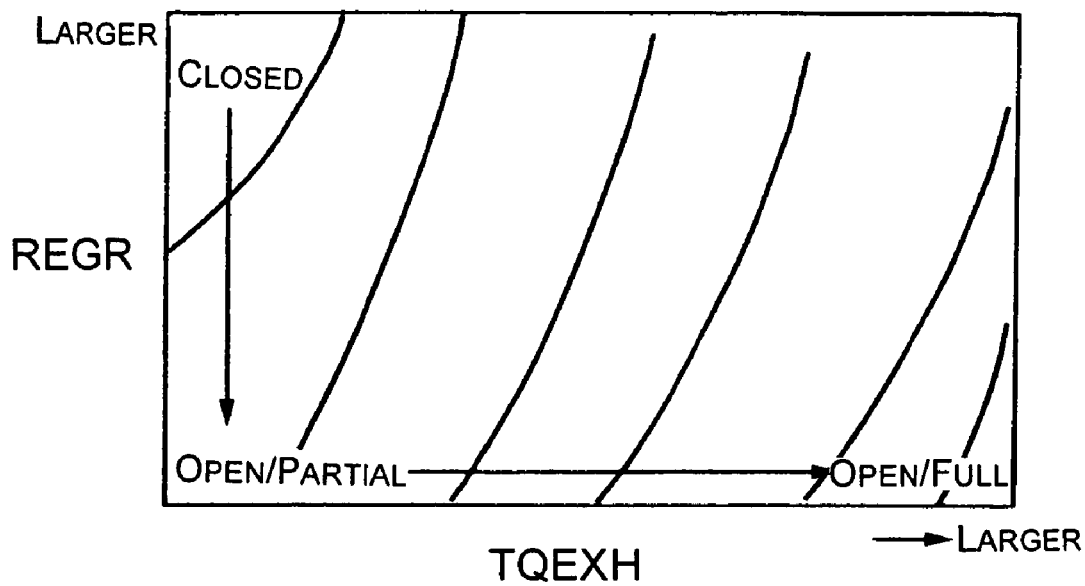
FIG. 11 is a characteristic diagram illustrating characteristics of a map MRAVEGR used in step S304 in the functional block diagram of FIG. 8.
Figure 12:
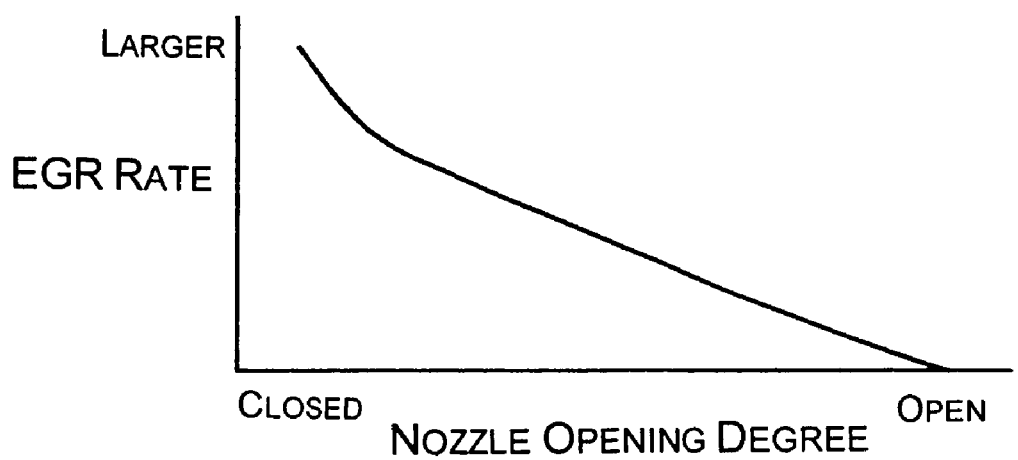
FIG. 12 is a characteristic diagram illustrating a relationship between the nozzle opening degree and an EGR ratio in accordance with the one embodiment of the present invention.
Figure 13:
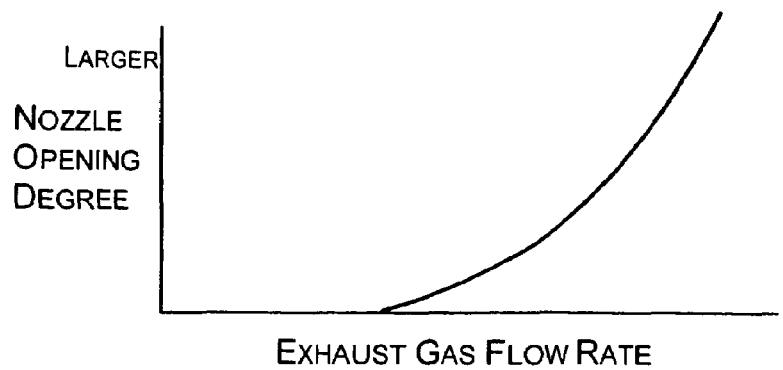
FIG. 13 is a characteristic diagram illustrating a relationship between the exhaust gas flow rate and the nozzle opening degree in accordance with the one embodiment of the present invention.

Then, in step S304, the control unit 5 is configured and arranged to determine a reference nozzle opening degree required to obtain a target EGR ratio REGR (shown in step S305) based on the target exhaust gas flow rate TQEXH and the target EGR ratio REGR by using a map MRAVEGR. FIG. 11 illustrates a general characteristic of the map MRAVEGR. More specifically, the relationship between the opening degree of the variable nozzle 24 and the EGR ratio when the opening degree of the EGR valve 6 is held constant generally shows a characteristic curve as shown in FIG. 12 because the smaller the opening degree of the variable nozzle 24 becomes, the higher the back pressure of the engine 1 becomes. Additionally, when the supercharging pressure is held constant, the relationship between the exhaust gas flow rate and the opening degree of the variable nozzle 24 generally shows a characteristic curve shown in FIG. 13. Accordingly, the map MRAVEGR shown in FIG. 11 is derived from these two relationships between the opening degree of the variable nozzle 24 and the EGR ratio, and the opening degree of the variable nozzle 24 and the supercharging pressure.

Figure 14:
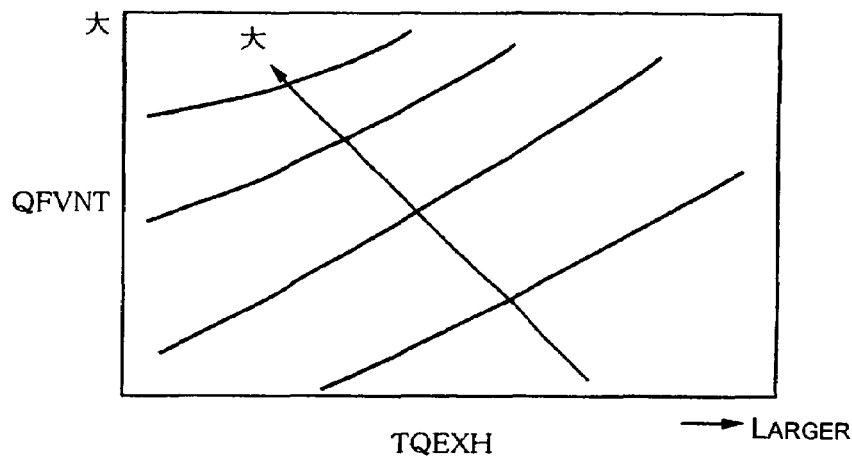
FIG. 14 is a characteristic diagram illustrating characteristics of a map MRAVQFO used in step S306 in the functional block diagram of FIG. 8.

In addition to the exhaust gas flow rate, the exhaust gas temperature also contributes to the operating characteristic of the turbo supercharger 21. Thus, in step S306, a map MRAVQFO that allocates the opening degree correction amount with respect to the fuel injection quantity QFVNT and the target exhaust gas flow rate TQEXH in order to compensate for the effect of the exhaust gas temperature. FIG. 14 illustrates the general characteristic of the map MRAVQFO.

Accordingly, the map MRAVEGR of step S304 and the map MRAVQF0 of step S306 are used to determine a target opening degree of the variable nozzle 24 without considering the decrease in the equivalent surface area of the particulate filter 29. Thus, the output values from steps S304 and steps S306 are added together in step S307 and the resulting total is outputted as a target nozzle opening degree MRAVO.

In step S308, the control unit 5 is configured and arranged to apply a correction value KRAV_A obtained in steps S314 to S316 based on the particulate matter accumulation amount of the particulate filter 29 when the EGR is not performed in the engine 1, and output the final target nozzle opening degree TRAV. The capacity of the turbo supercharger 21, i.e., the opening degree of the variable nozzle 24, is controlled according to the target nozzle opening degree TRAV.

In step S312, the control unit 5 is configured and arranged to determine whether an EGR valve opening degree STPD (shown in step S310) is 0 (shown in step S311). If the EGR valve opening degree STPD is 0 (i.e., the EGR is not performed in the engine 1), the control unit 5 is configured and arranged to switch a switching unit in step S313 to open up a path from step S316. The value 0 of S311 is selected in step S313 when there is no input from step S312. Thus, when the EGR valve 6 is even slightly open, the control unit 5 is configured and arranged to determine the engine 1 is operating in an EGR region. Therefore, the control unit 5 is configured and arranged to output in step S313 the value 0 as the correction value so that essentially no correction is added in step S308. If the engine 1 is operating in a non-EGR region, i.e., if EGR (exhaust gas recirculation) is not performed in the engine 1 (when a non-EGR state is detected), the output of step S312 causes switching unit in step S313 to switch so that the revision value KRAV_ADPF outputted from step S316 is added in step S308.

Figure 15:
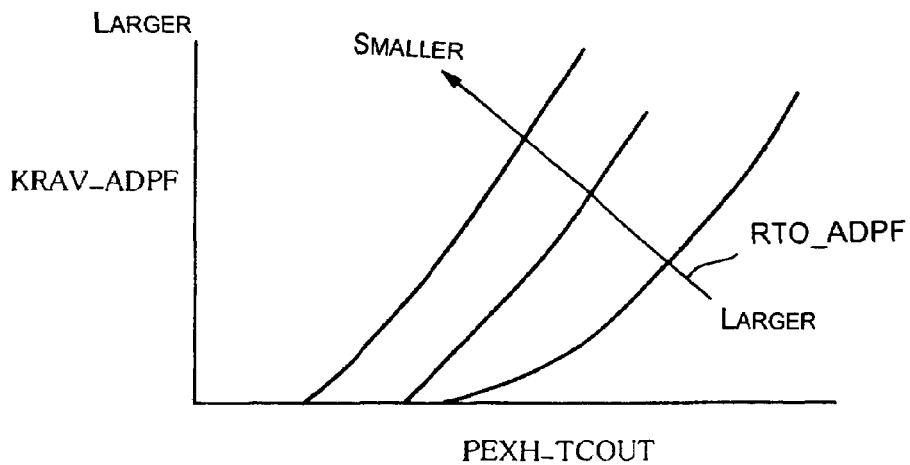
FIG. 15 is a characteristic diagram illustrating characteristics of a map MAP_KRAV_ADPF used in step S316 in the functional block diagram of FIG. 8.

More specifically, in step S316, the control unit 5 is configured and arranged to use a prescribed map MAP_KRAV_ADPF to find the correction value KRAV_ADPF based on a turbine outlet pressure PEXH_TCOUT (shown in step S314) and the clogging ratio RTO_ADPF (shown in step S315). The turbine outlet pressure PEXH_TCOUT is outputted from step S232 of FIG. 3, as described above. Also, as explained above, the clogging ratio RTO_ADPF is a value that becomes smaller as the exhaust particulate matter accumulates in the particulate filter 29, and obtained in step S226 of FIG. 3. FIG. 15 illustrates the general characteristic of the map MAP_KRAV_ADPF used in step S316. As seen in FIG. 15, the correction value KRAV_ADPF increases as the turbine outlet pressure PEXH_TCOUT rises and also as the clogging ratio RTO_ADPF decreases. Thus, when the equivalent surface area ADPFD of the particulate filter 29 decreases due to the accumulation of the exhaust particulate matter while the engine 1 is operating in the non-EGR region, the target nozzle opening degree TRAV is corrected to a larger value.

Accordingly, the opening degree of the variable nozzle 24 is corrected to a larger opening degree when the particulate filter 29 becomes clogged with the exhaust particulate matter. Thus, the pressure increase at the inlet side of the exhaust turbine 22, which causes the back pressure of the engine 1 to increase, is suppressed, is suppressed. As a result, the increase in the internal EGR ratio is suppressed, which uses residual gases in the previous combustion cycle.

Figure 9:
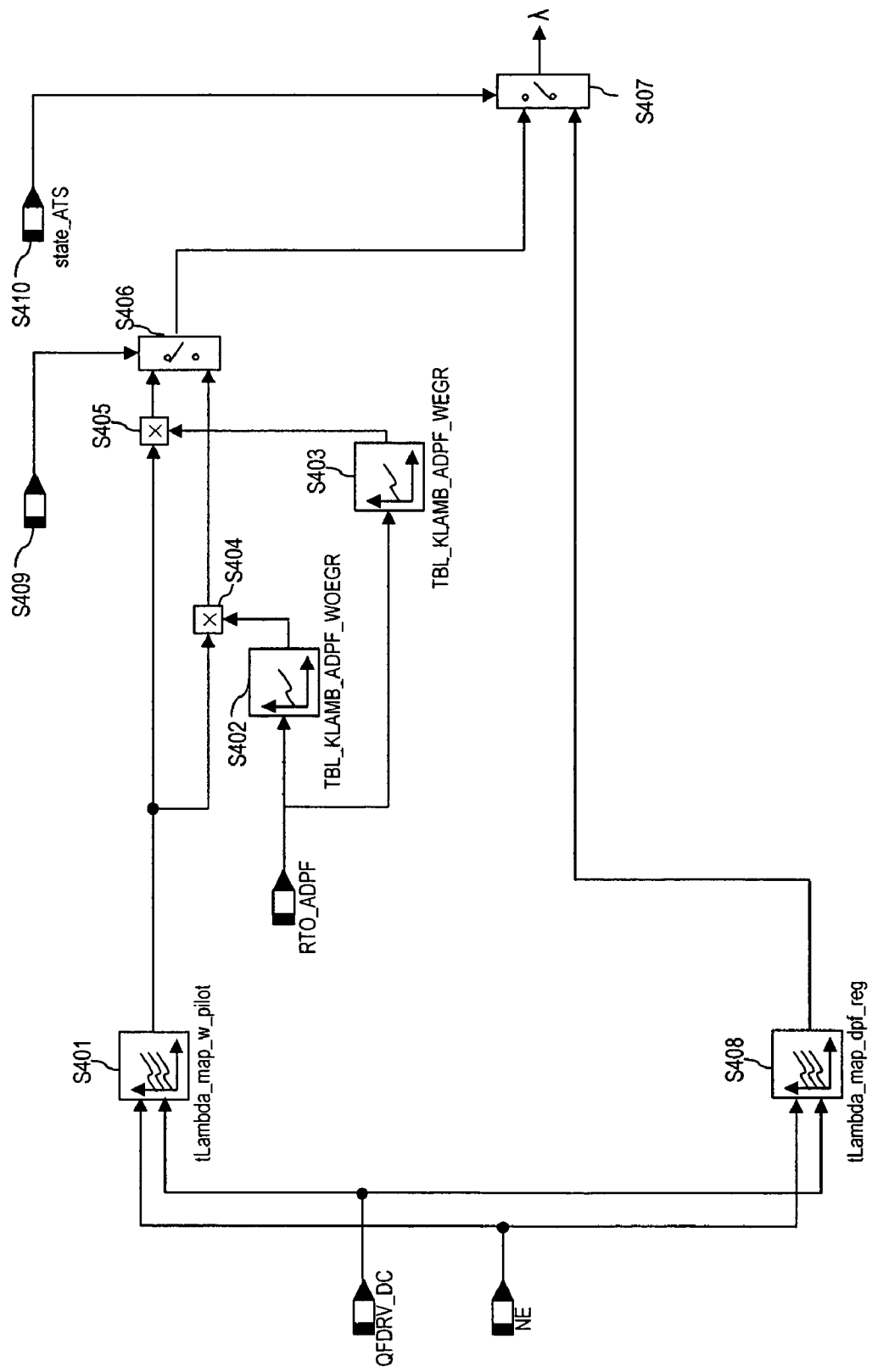
FIG. 9 is a functional block diagram of a control processing executed in the turbocharged engine control system in accordance with the one embodiment of the present invention in order to determine a target air-fuel ratio.

Referring now to FIG. 9, a control processing executed by the control unit 5 to determine an air fuel ratio will be explained. In the EGR region, the decrease in the equivalent surface area ADPFD caused by the accumulation of the exhaust particulate matter in the particulate filter 29 is taken into a consideration in operating the engine 1 by correcting a target air fuel ratio.

As explained above, in this embodiment of the present invention, the target opening degree of the variable nozzle 24 of the exhaust gas turbine 22 (i.e., the capacity of the turbo supercharger 21) is corrected based on the particulate matter accumulation amount in the particulate filter 29 when the engine is operating in a non-EGR region, i.e., when the EGR valve 6 is closed. In other words, the target opening degree of the variable nozzle 24 of the exhaust gas turbine 22 is not corrected based on the particulate matter accumulation amount in the particulate filter 29 when the engine is operating in the EGR region, i.e., when the EGR valve 6 is open based on the particulate matter accumulation amount in the particulate filter 29.

FIG. 9 is a functional block diagram illustrating the control operations executed by the control unit 5 in order to determine the target air fuel ratio.

In step S401, the control unit 5 is configured and arranged to use a map tLambda_map_w_pilot to determine the target air fuel ratio $\lambda_0$ (i.e., an excess air ratio) based on the engine rotational speed NE and a requested fuel injection quantity QFDRV_DC, which is determined based on the accelerator position.

Figure 16:
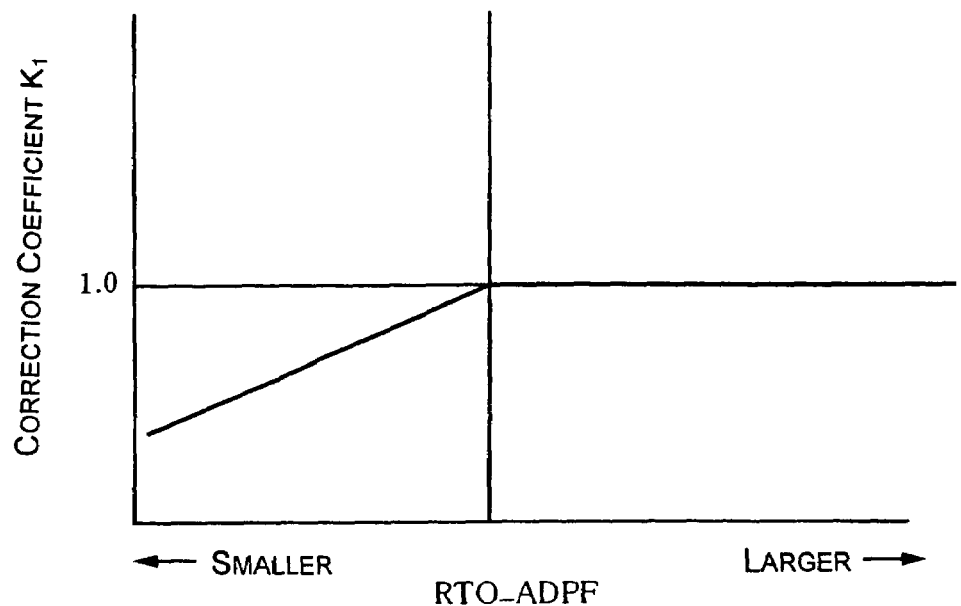
FIG. 16 is a characteristic diagram illustrating characteristics of a map TBL_KLAMP_ADPF_WOEGR used in step S402 in the functional block diagram of FIG. 9.

Then, the control unit 5 is configured and arranged to use a map TBL_KLAMB_ADPF_WOEGR in step S402 to determine a correction coefficient $K_1$ based on the clogging ratio RTO_ADPF. More specifically, the map TBL_KLAMB_ADPF_WOEGR is used to determine the correction amount of the target air fuel ratio $\lambda_0$ when the capacity of the turbo supercharger 21 is corrected based on the particulate matter accumulation amount of the particulate filter 29 by changing the opening degree of the variable nozzle 24 of the exhaust turbine 22 (i.e., when EGR is not performed in the engine 1). FIG. 16 illustrates the characteristic of the map TBL_KLAMB_ADPF_WOEGR in which the correction coefficient $K_1$ is less than 1 when the clogging ratio RTO_ADPF is smaller than a prescribed value. The correction coefficient $K_1$ is equal to 1 when the clogging ratio RTO_ADPF is equal to or larger than the prescribed value. The prescribed value of the clogging ratio RTO_ADPF is preferably determined by the capacity of the particulate filter 29 and the engine 1.

Figure 17:
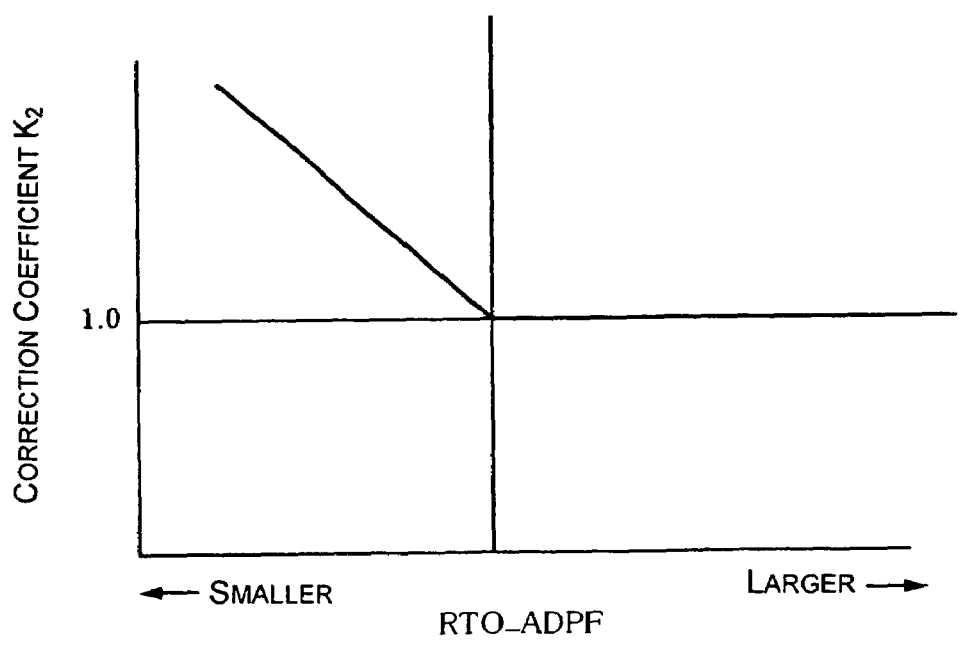
FIG. 17 is a characteristic diagram illustrating characteristics of a map TBL_KLAMP_ADPF_WEGR used in step S403 in the functional block diagram of FIG. 9.

In step S403, the control unit 5 is configured and arranged to use a map TBL_KLAMB_ADPF_WEGR to determine a correction coefficient $K_2$ based on the clogging ratio RTO_ADPF. The map TBL_KLAMB_ADPF_WEGR in step S403 is used to calculate the correction amount of the target air fuel ratio when EGR is performed in the engine 1. FIG. 17 illustrates the characteristic of the map TBL_KLAMB_ADPF_WEGR used in step S403 in which $K_2$ is greater than 1 when the clogging ratio RTO_ADPF is smaller than a prescribed value, and equal to 1 when the clogging ratio RTO_ADPF is larger than the prescribed value. The prescribed value of the clogging ratio RTO_ADPF is preferably determined by the capacity of the particulate filter 29 and the engine 1.

In step S404, the control unit 5 is configured and arranged to multiply the target air fuel ratio $\lambda_0$ calculated in step S401 by the correction coefficient $K_1$ calculated in step S402 and output the result to a switching unit in step S406.

In step S405, the control unit 5 is configured and arranged to multiply the target air fuel ratio $\lambda_0$ calculated in step S401 by the correction coefficient $K_2$ calculated in step S403 and output the result to the switching unit in step S406.

In step S406, the control unit 5 is configured and arranged to switch the switching unit in accordance with an input from step S409. The input from step S409 indicates whether or not the EGR valve 6 is fully closed. Similarly to step S312 of FIG. 8, step S409 is configured and arranged to determine whether the EGR valve opening degree STPD is 0. If the EGR valve 6 is fully closed (i.e., the engine 1 is operating in the non-EGR region), the control unit 5 is configured and arranged to switch the switch unit in step S406 such that the output value from step S404 obtained by multiplying the target air fuel ratio $\lambda_0$ calculated in step S401 by the correction coefficient $K_1$ calculated in step S402 is outputted to step S407 as the target air fuel ratio value $\lambda_1$. If the EGR valve 6 is open (i.e., the engine 1 is operating in the EGR region), the control unit 5 is configured and arranged to switch the switching unit in step S406 such that the output value from step S405 obtained by multiplying the target air fuel ratio $\lambda_0$ calculated in step S401 by the correction coefficient $K_2$ calculated in step S403 is outputted to step S407 as the target air fuel ratio value $\lambda_1$.

Thus, when EGR is not being conducted and the target opening degree of the variable nozzle 24 of the exhaust turbine 22 is corrected based on the particulate matter accumulation amount of the particulate filter 29, the control unit 5 is configured and arranged to use the correction coefficient $K_1$ calculated in step S402 to correct the target air fuel ratio $\lambda_0$ in accordance with the degree of clogging of the particulate filter 29. More specifically, the characteristic curve of the correction coefficient $K_1$ as seen in FIG. 16 is configured such that the target air fuel ratio $\lambda_0$ is corrected to a lower value as the opening degree of the variable nozzle 24 is corrected to a higher value in response to the decrease in the equivalent surface area ADPFD.

As a result, increases in the internal EGR (exhaust gas recirculation) and degradation of the fuel efficiency caused by the clogging of the particulate filter 29 are prevented. Thus, and the declining in engine output perceived by the driver is suppressed. Consequently, the amount by which the driver increases the accelerator pedal depression amount as the clogging progresses is held to a very small amount. Therefore, the increase in the amount of the exhaust particulate matter in the exhaust gas discharged from the engine 1 caused by increasing the accelerator pedal depression amount is avoided.

When EGR is being conducted in the engine 1 and the equivalent surface area ADPFD of the particulate filter 29 decreases, the control unit 5 is configured and arranged to use the correction coefficient $K_2$ calculated in step S403 to correct the target air fuel ratio $\lambda_0$ in accordance with the degree of clogging of the particulate filter 29. More specifically, as the clogging of the particulate filter 29 progresses, the value of the correction coefficient $K_2$ increases to a value larger than 1, and thus, the target air fuel ratio $\lambda_0$ is corrected to a leaner value. Therefore, the amount of the exhaust particulate matter in the exhaust gas discharged from the combustion chamber 19 is reduced directly.

Moreover, in step S408, the control unit 5 is configured and arranged to use a map tLambda_map_dpf_reg to determine a target air fuel ratio $\lambda_2$ required to regenerate the particulate filter 29 based on the engine rotational seed NE and the requested fuel injection quantity QFDRV_DC determined based on the accelerator pedal position. The calculated target air fuel ratio $\lambda_2$ is outputted to step a switching unit in step S407.

In step S407, the control unit 5 is configured and arranged to switch the switching unit in accordance with a regeneration request signal state_ATS inputted from step S410. The regeneration request signal state_ATS indicates whether regeneration of the particulate filter 29 has been requested and the regeneration of the particulate filter 29 is in progress. If the regeneration of the particulate filter 29 is in progress, the control unit 5 is configured and arranged to switch the switching unit in step S407 so that the target air fuel ratio $\lambda_2$ calculated in step S408 is outputted as the final target air fuel ratio $\lambda$. On the other hand, if the regeneration of the particulate filter 29 is not in progress, the control unit 5 is configured and arranged to switch the switching unit in step S407 so that the target air fuel ratio $\lambda_1$ outputted from step S406 is outputted as the final target air fuel ratio $\lambda$.

Figure 10:
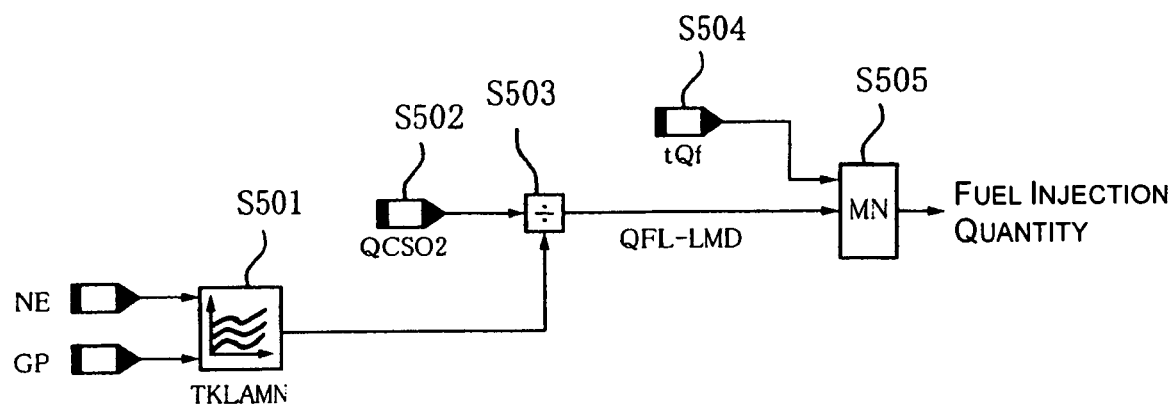
FIG. 10 is a functional block diagram of a control processing executed in the turbocharged engine control system in accordance with the one embodiment of the present invention in order to determine a fuel injection quantity.

FIG. 10 is a functional block diagram illustrating the control operations executed by the control unit 5 in order to determine a fuel injection quantity.

Figure 18:
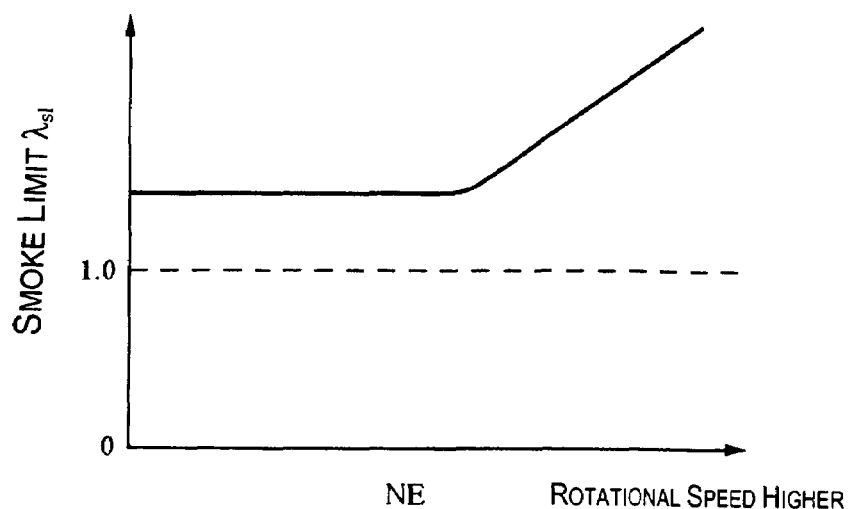
FIG. 18 is a characteristic diagram illustrating characteristics of a map TKLAMN used in step S501 in the functional block diagram of FIG. 10.

In step S501 in FIG. 10, the control unit 5 is configured and arranged to determine a smoke limit air fuel ratio $\lambda_{s1}$ based on the engine rotational speed NE and the current gear position data GP of the transmission by using a prescribed map TKLAMN. The smoke limit air fuel ratio $\lambda_{s1}$ is set to be the lowest excess air ratio within a range of the air fuel ratio that does not discharge smoke from the combustion chamber 19. FIG. 18 illustrates the general characteristic of the map TKLAMN used in step S501. When the engine 1 is operating in a low rotational speed region, the smoke limit air fuel ratio $\lambda_{s1}$ is fixed at a prescribed lean value that is greater than 1. When the engine is operating in a medium to high rotational speed region, the smoke limit air fuel ratio $\lambda_{s1}$ changes to a leaner value in proportion to the engine rotational speed NE. Since the smoke limit air fuel ratio $\lambda_{s1}$ also varies according to the gear position, a characteristic as shown in FIG. 18 is preferably established for each gear position.

In step S502, the control unit 5 is configured and arranged to calculate a cylinder fresh air quantity QCS02 which is an actual quantity of fresh air inside the combustion chamber 19, including the oxygen recirculated by the EGR.

The cylinder fresh air quantity QCS02 is calculated using the following Equation (2).

$$QCS02 = Qac + [(Qac \times MEGR)/100] \times [(\lambda_a - 1)/\lambda_a] \quad (2)$$

In Equation (2), Qac is the fresh air quantity detected by the air flow meter 35, MEGR is the EGR ratio, and $\lambda_a$ is the current exhaust gas air fuel ratio (excess air ratio) detected by the air fuel ratio sensor 17.

In step S503, the control unit 5 is configured and arranged to divide the cylinder fresh air quantity QCS02 by the smoke limit air fuel ratio $\lambda_{s1}$ outputted from step S501 to calculate a maximum fuel injection quantity QFL_LMD, which is a maximum smoke limit fuel injection quantity within a range that does not discharge smoke. Since the smoke limit air fuel ratio $\lambda_{s1}$ is obtained as an excess air ratio value, the control unit 5 is also configured and arranged to execute processing to temporarily convert the smoke limit air fuel ratio $\lambda_{s1}$ to an air fuel ratio (A/F) using a constant (e.g., 14.6) corresponding to the stoichiometric air fuel ratio.

In step S505, the control unit 5 is configured and arranged to compare the accelerator requested fuel injection quantity tQf determined in step S504 based on the amount by which the driver depresses the accelerator pedal to the maximum fuel injection quantity QFL_LMD which is the smoke limit fuel injection quantity. Then, the control unit 5 is configured and arranged to set (output) the smaller of the accelerator requested fuel injection quantity tQf and the maximum fuel injection quantity QFL_LMD as the final fuel injection quantity. Then the control unit 5 is configured and arranged to control the fuel injection nozzle 14 such that the fuel is injected in accordance with the final fuel injection quantity set in step S505. Accordingly, the final fuel injection quantity is limited to the maximum fuel injection quantity QFL_LMD, which is the maximum smoke limit fuel injection quantity within a range that does not discharge smoke. Therefore, in a case where the amount of exhaust particulate matter accumulated in the particulate filter 29 has increased and the equivalent surface area ADPFD has decreased greatly, the air fuel ratio is held to a value that is leaner than the smoke limit air fuel ratio $\lambda_{s1}$. Thus, the increase in the amount of exhaust particulate matter in the exhaust gas discharged from the engine 1 can be held to a minimum even if the driver increases the accelerator pedal depression amount greatly in order to compensate for declined engine output.

Figure 19:
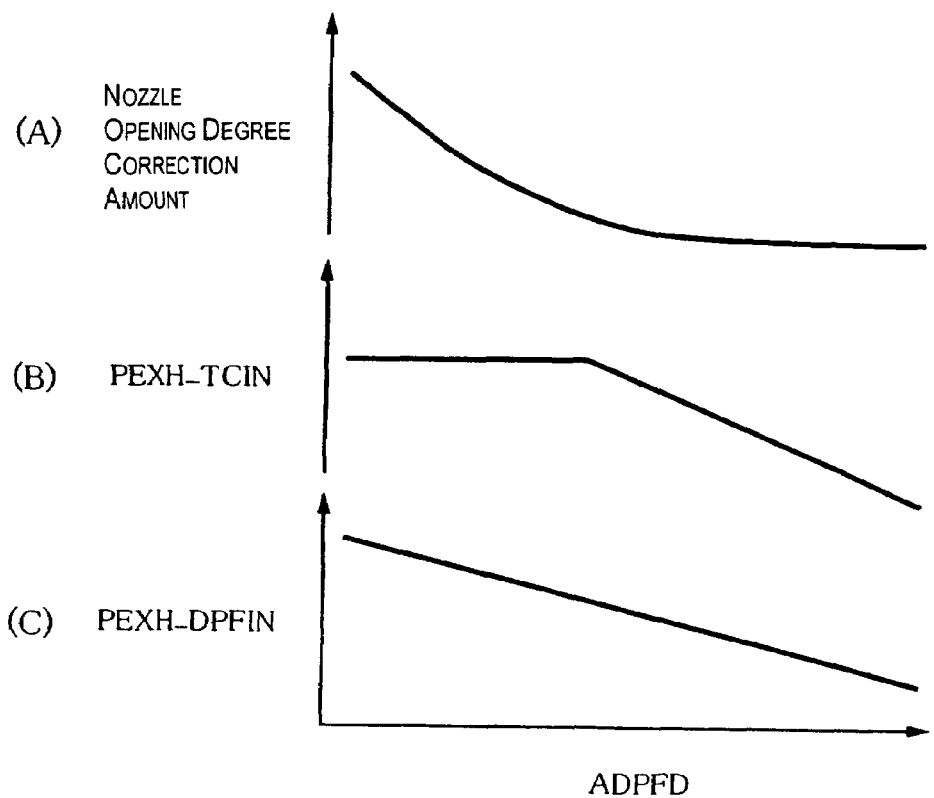
FIG. 19 is a characteristic diagram illustrating relationships between of the equivalent surface area and a correction amount of the nozzle opening degree, an inlet pressure of an exhaust gas turbine, and an inlet pressure of a particulate filter in accordance with the one embodiment of the present invention.

FIG. 19 illustrates relationships between a change in the equivalent surface area ADPFD of the particulate filter 29 and the correction amount of the opening degree of the variable nozzle 24 (diagram (A)), the inlet pressure PEXH_TCIN of the exhaust gas turbine 22 (diagram (B)), and the inlet pressure PEXH_DPFIN of the particulate filter 29 (diagram (C)). When the equivalent surface area ADPFD decreases and the exhaust gas turbine inlet pressure PEXH_TCIN (diagram (B)) reaches the vicinity of the upper limit thereof, the fuel injection quantity is limited to the maximum fuel injection quantity QFL_LMD as described above. The diagrams (A) to (C) in FIG. 19 are shown as when the engine 1 is operating in the non-EGR region.

Accordingly, in the present invention, when the pressure loss in the particulate filter 29 increases due to the accumulation of the particulate matter, the increase in pressure in the vicinity of the inlet of the exhaust turbine 22 is suppressed by correcting the opening degree of the nozzle 24 to a relatively larger degree. Therefore, the internal exhaust gas recirculation is suppressed, and thus, an increase in the back pressure of the engine and a reduction in the engine output are prevented. As a result, an increase in the accelerator pedal depression amount by the driver is held to a minimum level. Thus, the increase of the particulate matter in the exhaust gas is suppressed.

With the present invention, when the particulate matter accumulates in the particulate filter 29 and the pressure loss increases, the increase in the internal exhaust gas recirculation and the decrease in the engine output are suppressed. Therefore, the vicious cycle between the depression amount of the accelerator pedal being increased by the driver and the amount of the particulate matter in the exhaust gas being increased is effectively suppressed.

In the above explained embodiment of the present invention, the control unit 5 preferably constitutes an equivalent surface area estimating section, a nozzle opening degree correcting section, a target fuel ratio adjusting section and a fuel injection amount limiting section.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-284235. The entire disclosure of Japanese Patent Application No. 2003-284235 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A turbocharged engine control system comprising:
   an exhaust gas after-treatment system disposed in an exhaust passage configured and arranged to accumulate exhaust particulate matter discharged from an engine;
   a variable-capacity turbocharger including an exhaust turbine disposed in the exhaust passage having a variable nozzle with an opening degree being variably controlled to change a capacity of the variable-capacity turbocharger;
   an equivalent surface area estimating section configured and arranged to estimate an equivalent surface area of the exhaust gas after-treatment system which decreases due to an accumulation of the exhaust particle matter in the exhaust gas after-treatment system; and
   a nozzle opening degree correcting section configured and arranged to correct the opening degree of the variable nozzle to a larger degree in response to a decrease in the equivalent surface area of the exhaust gas after-treatment system that was estimated by the equivalent surface area estimating section.

2. The turbocharged engine control system as recited in claim 1, further comprising
   a target air fuel ratio correcting section configured and arranged to correct a target air fuel ratio of the engine to a richer value in response to the decrease in the equivalent surface area of the exhaust gas after-treatment system that was estimated by the equivalent surface area estimating section.

3. The turbocharged engine control system as recited in claim 1, further comprising
   a fuel injection amount limiting section configured and arranged to limit a fuel injection amount to an amount that is equal to or less than a smoke limit fuel injection amount irregardless of an accelerator pedal depression amount.

4. The turbocharged engine control system as recited in claim 2, further comprising
   a fuel injection amount limiting section configured and arranged to limit a fuel injection amount to an amount that is equal to or less than a smoke limit fuel injection amount irregardless of an accelerator pedal depression amount.

5. The turbocharged engine control system as recited in claim 1, wherein
   the nozzle opening degree correcting section is configured and arranged to correct the opening degree of the variable nozzle to the larger degree in response to the decrease in the equivalent surface are of the exhaust gas after-treatment system upon a detection of a non-EGR state.

6. A method of controlling a turbocharged engine, comprising:
   estimating an equivalent surface area of an exhaust gas after-treatment system arranged in an exhaust passage, which decreases due to an accumulation of exhaust particulate matter in the exhaust gas after-treatment system; and
   correcting an opening degree of a variable nozzle of a variable-capacity turbocharger to a larger degree and correcting a target air fuel ratio of the engine to a richer value when the equivalent surface area that was estimated decreases.

7. The method as recited in claim 6, further comprising limiting a fuel injection amount to an amount that is equal to or less than a smoke limit fuel injection amount irregardless of an accelerator pedal depression amount.

8. The method as recited in claim 6, wherein
   the correcting the opening degree of the variable nozzle to the larger degree in response to the decrease in the equivalent surface are of the exhaust gas after-treatment system is performed upon a detection of a non-EGR state.

9. A turbocharged engine control system comprising:
   exhaust gas after-treatment means for accumulating exhaust particulate matter discharged from an engine, the exhaust gas after-treatment means being disposed in an exhaust passage;
   variable-capacity turbocharger means for supercharging the engine, the variable-capacity turbocharger means having an exhaust turbine disposed in the exhaust passage having a variable nozzle with an opening degree being variably controlled to change a capacity of the variable-capacity turbocharger means;

equivalent surface area estimating means for estimating an equivalent surface area of the exhaust gas after-treatment system which decreases due to an accumulation of the exhaust particle matter in the exhaust gas after-treatment means; and nozzle opening degree correcting means for correcting the opening degree of the variable nozzle to a larger degree in response to a decrease in the equivalent surface area of the exhaust gas after-treatment means that was estimated by the equivalent surface area estimating means.

* * * * *